Patented Jan. 7, 1941

2,227,928

UNITED STATES PATENT OFFICE 2,227,928

COMPOSITION OF MATTER CONTAINING AN IRON PHOSPHATE PIGMENT

Julius Drucker, Leverkusen-I. G. Werk, Germany, assignor, by mesne assignments, to Walther H. Duisberg, New York, N. Y.

No Drawing. Application February 25, 1939, Serial No. 258,464. In Germany March 10, 1938

4 Claims. (Cl. 134—39)

The present invention relates to new compositions of matter comprising a binding agent having incorporated therewith an iron phosphate pigment, said compositions of matter being valuable media for lacquering, varnishing, coating, enamelling, etc.

According to the present invention I have found that iron phosphates exhibit very valuable properties as pigments when incorporated with the usual binding agents; they are distinguished by a great covering power and a good miscibility with the binding agents. The iron phosphates mixed with organic binding agents, such as linseed oil, linseed oil lacquer, resin lacquer, emulsion lacquer, yield coatings which as to their effect as anti-rust agents in the least are equal to the red lead without showing the disadvantages of the latter one.

The iron phosphate is obtained by firstly preparing a so-called crude pigment, for instance by double decomposition of an aqueous iron salt solution with an aqueous alkali metal phosphate solution, which crude pigment thereupon is subjected to a heat treatment, eventually after having been washed. The heat treatment advantageously is performed by heating of a suspension of the crude pigment in water under superatmospheric pressure. Pigments are obtained showing brown, green, gray and black tones and which are distinguished by their great covering power and a good behaviour in the different binding agents. Those phosphates have proved as being especially effective, containing the iron in two stages of oxidation, i. e. ferric-ferrous-phosphates, while the proportion of iron and phosphoric acid, contained in this material, is of less importance. Substances which as to their stoichiometric composition must be considered as normal orthophosphates have an excellent protective effect. This effect is essentially decreased neither by excess iron oxide nor by excess phosphoric acid. But the content of phosphoric acid is limited in so far as the pigment for painting purposes must be practically insoluble in water. The tone as well as the behaviour in the binding agents depend on the quantity of three and divalent iron present in the pigments and furthermore on the manner in which the crude pigments are precipitated and heated. Excellent iron phosphate pigments are, for instance, those of the chemical composition: 5–30% of FeO, 20–50% of $Fe_2O_3$, 30–50% of $P_2O_5$. Pigments of brown tones, for instance, contain 10% of FeO, 35% of $Fe_2O_3$ and 40% of $P_2O_5$; pigments of green tones contain 13% of FeO, 45% of $Fe_2O_3$, 38% of $P_2O_5$ and those of black tones contain 23% of FeO, 36% of $Fe_2O_3$ and 37% of $P_2O_5$. The pigments thus obtained are difficultly soluble in mineral acids, as for instance 10% hydrochloric acid. The concentration and composition of the starting solutions, the temperature of precipitation and its duration, the intensity of stirring and the concentration of the hydrogen ions during and after the precipitation are to be adjusted to one another during the precipitation of the crude pigments, and the duration and temperature of heating, the concentration of the hydrogen ions and the content of electrolytes of the solution to be heated are to be adjusted to one another during the heating under pressure in a manner known per se.

The iron phosphate pigments can be used in admixture with other pigments, as for instance with baryte white.

The invention is illustrated by the following examples without being restricted thereto; the parts being by weight.

Example 1

512 parts of ferrous sulfate ($FeSO_4$—7 aq.) are dissolved in 600 parts of water and 540 parts of ferric chloride ($Fe_2Cl_6$—12 aq.) are dissolved in 800 parts of water; these solutions are mixed. 385 parts of a phosphoric acid solution of the specific gravity 1.7 are diluted with 3000 parts of water, and 400 parts of caustic soda dissolved in 3000 parts of water are likewise mixed. The iron salt solution is added within one hour to the phosphate solution at a temperature of 80° C. while thoroughly stirring; the stirring is continued for 2 hours. Thereupon the suspension is filtered, the filter-cake washed, suspended in 7000 parts of water, the suspension is made slightly Congo acid and heated for 30 minutes to 330° C. under a pressure of 200 atmospheres. Thereupon the whole is cooled, filtered, washed, dried and milled. A bluish-green pigment is obtained which in admixture with aqueous as well as with water-free binding agents yields coatings, showing a great covering power and having excellent fastness properties. In admixture with the different lacquers, as for instance oil lacquer, nitrocellulose lacquer and lacquers with which products are incorporated which are obtained by condensation of aromatic dicarboxylic acids, such as phthalic acid, and higher aliphatic acids, such as linoleic acid, on the one hand, and polyvalent alcohols, such as glycerol, on the other hand, coatings are obtained, showing apart from a good blending a beautiful brightness.

Example 2

810 parts of $Fe_2Cl_6$—$12H_2O$ are dissolved in 800 parts of water and mixed with a solution of 417 parts of $FeSO_4$—$7H_2O$ dissolved in 600 parts of water, and the whole is added within one hour while stirring to a solution of 465 parts of $P_2O_5$ and 480 parts of NaOH dissolved in 6000 parts of water at a temperature of 80° C. The suspension which is slightly acid to litmus is heated at a pressure of 200 atmospheres for 2 hours up to 320° C. The suspension then is cooled, filtered, the filter cake obtained is washed, dried and milled. 50 parts of the black powder obtained and 40 parts of linseed oil lacquer are mixed to a paste capable of being spread.

An iron plate, freed from dust by sand blasting was coated with this paste. Even after a some year's storing in the open air the coating was not affected and the film of linseed oil lacquer still remained elastic. After removal of the coating by means of alcoholic potassium hydroxide solution the surface was in an absolutely unobjectionable condition.

I claim:
1. Compositions of matter comprising a binding agent having incorporated therewith a ferric-ferrous phosphate pigment of the chemical composition: 5–30% of FeO, 20–50% of $Fe_2O_3$ and 30–50% of $P_2O_5$.
2. Compositions of matter comprising a binding agent having incorporated therewith a brown ferric-ferrous phosphate pigment of the following composition: 10% of FeO, 35% of $Fe_2O_3$, 40% of $P_2O_5$.
3. Compositions of matter comprising a binding agent having incorporated therewith a green ferric-ferrous phosphate pigment of the following composition: 13% of FeO, 45% of $Fe_2O_3$, 38% of $P_2O_5$.
4. Compositions of matter comprising a binding agent having incorporated therewith a black ferric-ferrous phosphate pigment of the following composition: 23% of FeO, 36% of $Fe_2O_3$, 37% of $P_2O_5$.

JULIUS DRUCKER.